Nov. 22, 1938.　　　A. M. ROSSMAN　　　2,137,990
FREQUENCY CONVERTER
Filed Jan. 17, 1936
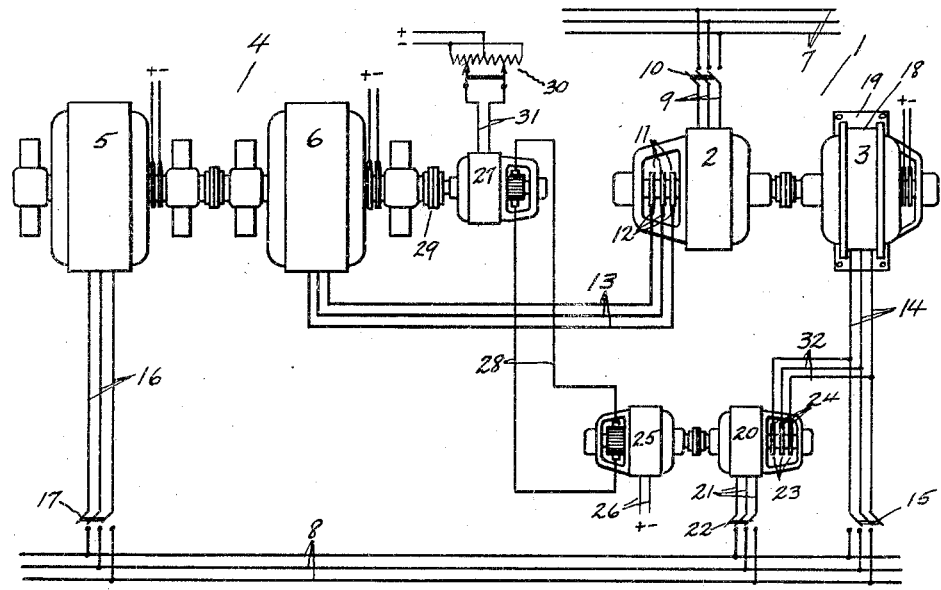
FIG. 1
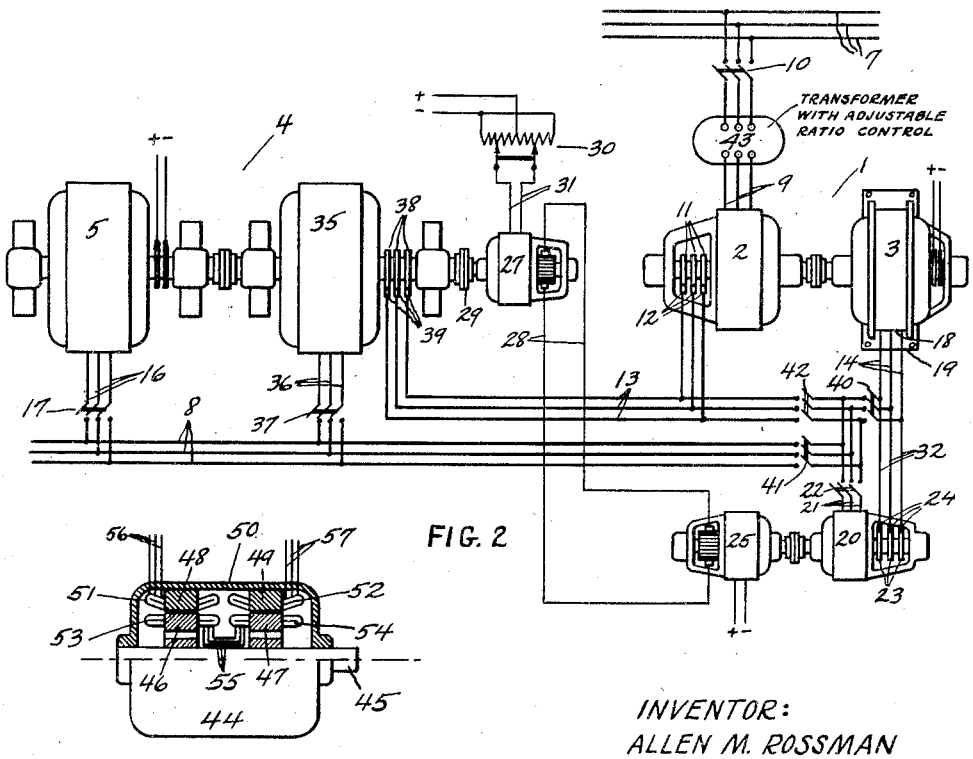
FIG. 2
FIG. 3
INVENTOR:
ALLEN M. ROSSMAN
BY: C. T. Parker
ATTORNEY Patented Nov. 22, 1938

2,137,990

UNITED STATES PATENT OFFICE 2,137,990

FREQUENCY CONVERTER

Allen M. Rossman, Wilmette, Ill.

Application January 17, 1936, Serial No. 59,556

18 Claims. (Cl. 172—281)

This invention relates generally to frequency converters for transmitting power between two electrical systems of different frequencies, and more particularly to means for reducing the weight and cost of this type of equipment.

The most common type of frequency converter consists of a motor generator set comprising two direct connected synchronous machines, one of the machines being connected to each of the two systems. As both machines must run at the same speed of rotation, the speed of the set must obviously be a synchronous speed obtainable from an even number of poles on each machine when operated at its respective system frequency.

That is, as the speed of a synchronous machine is proportional to the frequency ($f$) and inversely proportional to the number of poles ($p$), the relation between the two machines is expressed by the following equation:

$$f_1/p_1 = f_2/p_2$$

where $p_1$ and $p_2$ must each of course be divisible by 2. For example, a frequency converter for tying a 60 cycle system with a 30 cycle system might be designed for 900 R. P. M., with 8 poles on the 60 cycle machine and 4 poles on the 30 cycle machine. There is obviously but little difficulty in interconnecting two systems of which one frequency is an even multiple of the other, as there are several desirable synchronous speeds which are common to both frequencies.

In this country, however, the great majority of systems operate at either 60 cycles or 25 cycles. Although 60 cycles is by far the most common, 25 cycle systems are still in general use in railway electrifications, steel mills, and in those parts of the country in which electrification was accomplished at a comparatively early date. Hence, the largest demand for frequency converters is for interconnecting 25 cycle systems with 60 cycle systems.

As the number of poles on the two machines in this case must be in the ratio of 60 to 25 or 2.4 to 1, the combination having the fewest even numbers of poles which will satisfy the above equation is 24 poles and 10 poles respectively, which unfortunately results in the comparatively low speed of 300 R. P. M.

It is a well known rule that the capacity of a given synchronous or induction machine is directly proportional to the lineal speed of the rotor element relative to the stator element. For a given speed of rotation, the lineal speed of a rotor is proportional to its diameter, but is limited by practical considerations of bracing the windings and anchoring the pole pieces against centrifugal force. In the case of salient pole synchronous machines, the practical limit of peripheral speed is approximately 15,000 to 16,000 feet per minute, but to attain these speeds, a 300 R. P. M. machine must have a rotor diameter of 16 to 17 feet, which is much too large for mechanical reasons, except possibly on machines of very high capacities.

It is evident that in frequency converters of medium and small sizes, the core material is not used to greatest advantage, and therefore the sizes and weights of the machines are proportionately higher than in other applications of electrical machines where higher rotative speeds can be used.

The principal object of this invention relates to the provision of a frequency converter which is not restricted to a low speed of operation but in which the same ratio of frequencies may be obtained by lighter, higher speed machines than have heretofore been employed.

In accomplishing this object I have found that if instead of converting from 60 cycles directly to 25 cycles, the conversion be made in two steps—first from 60 cycles to an intermediate frequency, then to 25 cycles, converting machines of substantially higher speeds can be employed. For instance, if the first stage of conversion be from 60 cycles to 50 cycles, a pole ratio of 12/10 can be used, resulting in a speed of 600 R. P. M. The second stage of conversion is then from 50 cycles to 25 cycles, which being an even 2 to 1 ratio, affords a choice of several speeds higher than the conventional speed of 300 R. P. M.

A further object of my invention is concerned with a further decrease in size and weight of the 2-stage converter by the use of combinations of induction and synchronous machines, yet providing for voltage and power factor control.

Another object has to do with means for adjusting the ratio of frequencies between the two power systems.

A still further object relates to providing a two-stage frequency converter comprising a combination of induction and synchronous machines, but without the necessity for collector rings for handling large quantities of power.

Other objects will be made apparent to those skilled in the art by the description and explanation which follows, reference being had to the drawing which forms a part of this disclosure, in which—

Figure 1 is a diagram of connections of one embodiment of my invention.

Figure 2 is a diagram of connections of a second embodiment of my invention.

Figure 3 is an elevation, partly in section, of an alternative design of induction motor for use in my invention.

Throughout the drawing and specification, like reference numerals refer to like parts.

In Figure 1 the main conversion equipment comprises two motor-generator sets. One of the sets 1 comprises a wound rotor type induction machine 2 and a synchronous machine 3 coupled together. The other motor-generator set 4 comprises a pair of synchronous machines 5, 6 coupled together.

The function of this frequency converter is to interconnect two electrical power systems of different frequencies for the purpose of transferring energy from one to the other, each of which systems is respectively represented by a set of bus bars 7, 8.

I do not intend to restrict the use of the term "power system" to include only those electrical systems having generating equipment connected directly thereto, but rather, to include any electrical system whether it is a power generating system or whether it is merely a power consuming system, or both.

The wound rotor induction machine 2 of the first set 1 has a primary winding connected to one set of bus bars 7 by means of leads 9 and a switch 10. The secondary winding is brought out to collector rings 11 and is connected by means of brushes 12 and conductors 13 in series with the armature winding of one of the synchronous machines 6 of the other motor-generator set 4.

I wish it to be understood that although in this disclosure I refer to the rotor winding of a slip ring type induction machine as the secondary winding and to the stator winding as the primary, I do not intend to limit them as such, as they can be interchangeably termed.

The synchronous machine 3 of the first motor generator set 1 is connected to the bus bars 8 of the other power system by leads 14 and a switch 15.

The synchronous machine 5 of the other set 4 is also connected to the bus bars 8 by leads 16 and a switch 17.

I will now explain the operation of this embodiment as a fixed ratio frequency converter Assuming the upper bus 7 to represent the system of higher frequency and the flow of power to be from the higher frequency bus 7 to the lower frequency bus 8, the induction machine 2 operates as a motor, driving the synchronous machine 3 as a generator, which limits the speed of the motor 2 to a speed appreciably below its synchronous speed, causing power at a definite predetermined frequency to flow from the secondary winding through the rings 11, brushes 12, and conductors 13 to the synchronous machine 6. The latter operates as a motor to drive the other synchronous machine 5 as a generator, sending power into the other system bus 8.

The amount and direction of power flow can be controlled as in a conventional converter by angularly shifting the stator of any one of the synchronous machines, a method well known to those skilled in the art. That is, by shifting the stator 18 of one of the synchronous machines 3 in its cradle 19 in one direction, power can be made to flow from the lower frequency bus 8 to the synchronous machines 3, 5 operating as motors, whereupon the induction machine 2 generates power into the bus 7 from mechanical energy supplied by the synchronous motor 3 to which is added electrical energy through the secondary winding from the synchronous generator 6. By shifting stator 18 in the opposite direction the direction of the flow of power can be reversed.

Further explanation of operation and advantages of my invention can best be made by means of examples. Assume that power is to be transfered from a 60-cycle system bus 7 to a 25 cycle bus 8. Let the induction machine 2 be designed with 4 poles and coupled to a 10 pole synchronous machine 3 which fixes the speed of the set 1 at 300 R. P. M., the latter machine being connected to the 25 cycle bus by the switch 15.

At 300 R. P. M. which is ⅙ of the synchronous speed of the induction machine 2, ⅚ of the power input to the primary of that machine will flow out of the secondary winding at 50 cycles to the synchronous machine 6 (neglecting losses), the other ⅙ being generated by the synchronous machine 3 at 25 cycles. The 50 cycle power then flows into the synchronous machine 6, which drives the 25 cycle synchronous machine 5. The ratio of poles on the two last mentioned machines is 2/1, therefore these machines may be designed with 4 and 2 poles, 8 and 4, 12 and 6, etc., giving speeds of 1500, 750 and 500 R. P. M. respectively.

There are numerous other combinations of poles and operating speeds that may be employed in applying the principles of my invention. The intermediate frequency between the two stages of conversion need not be 50 cycles. For instance, the steps of conversion can be 60 cycles to 30 cycles to 25 cycles, or 60 cycles to 15 cycles to 25 cycles.

Furthermore, in the embodiment of Figure 1, the bus bars 7 connected to the induction machine 2 do not necessarily belong to the system of higher frequency but in some applications may operate at the lower of the two frequencies. Where the busbars 7 operate at 25 cycles, the induction machine 2 could be a 2-pole machine operating at 600 R. P. M. or a 4-pole machine running at 300 R. P. M., delivering 15 cycle power from its secondary circuit. The synchronous machine 3 would then be a 12 or 24 pole, 60 cycle machine respectively. To convert the power from the intermediate circuit 13 at 15 cycles to the other bus bars 8 at 60 cycles requires synchronous machines 5, 6, having 8 poles and 2 poles respectively, running at 900 R. P. M., or 16 poles and 4 poles running at 450 R. P. M.

A further advantage of this invention is the adaptability of this converter to an adjustable ratio frequency converter, in case it is desired to allow the frequencies of the two systems to vary relative to each other, while maintaining control of the amount and direction of power interchanged between the two systems. This advantage lies in the possibility of applying adjustable speed control to a machine which carries but a small fraction of the total power interchanged between the systems, rather than to a large machine which carries the total converted power.

The conventional adjustable ratio converter comprises a synchronous machine connected to one power system, coupled to a wound rotor type induction machine, which is connected to the other system. By controlling the frequency of the energy flowing in the rotor winding of the induction machine, the speed of the converter is adjusted and hence the frequency of the energy flowing in the synchronous machine is varied with respect to the frequency of the energy in the primary winding of the induction machine. Therefore, the conventional method requires control equipment designed to handle the heavy secondary current of the main induction machine.

My invention contemplates adjustment of speed of one of the machines of one of the two motor generator sets, either of which is relatively small compared to the single M. G. set of the conventional type converter. I prefer to apply the speed control to the machine 3 which is coupled to the induction machine 2, as this machine, in most of the arrangements of my invention, is of the smallest capacity and handles the least amount of power. In the example given hereinbefore, this machine is only one-sixth of the size of one machine of a conventional 300 R. P. M. converter set, and carries but one-sixth of the total converted power.

It is therefore within the contemplation of the present invention to apply any of the systems of adjustable speed control known in the art, to one of the machines of either of the motor generator sets 1, 4.

I prefer, however, to employ a system of adjustable speed control which I have disclosed in a copending application, Serial No. 29,190, filed July 1, 1935, to which I hereby specifically refer for a complete explanation of the principles involved. The main reason for my preference for this system is that it can be applied to controlling the speed of a synchronous machine, having the well-known advantages of simplicity, ruggedness, power factor correction, etc.

As shown in Figure 1, the synchronous machine 3, instead of being connected directly to the bus 8 through a switch 15, as in the fixed ratio converter, can be connected to the bus in series with an induction frequency converter machine 20. This converter is a comparatively small wound rotor induction type machine having a primary winding connected to the bus 8 by leads 21 and a switch 22. The secondary winding of the converter 20 is connected to the synchronous machine 3 by collector rings 23, brushes 24 and branch leads 32 connected to the leads 14.

The operation of this machine 20 is as follows: When it is held stationary, it operates merely as a transformer, the frequency of the current in the leads 14 being equal to that of the bus 8. Now, if the rotor is rotated in one direction of rotation, the frequency of the energy in the synchronous machine winding is decreased below the bus frequency; if rotated in the opposite direction, the frequency of the energy is increased above that of the bus. The speed of the synchronous machine 3 is directly proportional to the frequency of the energy in its armature winding.

Coupled to the induction type converter 20 is a direct current machine 25, having a separately excited field, receiving direct current from any suitable source through a pair of field leads 26. Control of the speed and direction of rotation of the D. C. machine 25 is accomplished by adjusting its armature voltage by means of a second direct-current machine 27, the armatures of the two machines 25, 27 being connected together in series by means of leads 28. The second D. C. machine can be driven by any suitable means, preferably at constant speed. As shown in Figure 1, it is coupled to the larger motor-generator set 4 by a shaft coupling 29.

The armature voltage is controlled by control of the field intensity of the second D. C. machine 27, adjustments being made by means of a potentiometer type rheostat 30. By moving the rheostat from one extreme to another, the excitation voltage, as applied to the field leads 31, is controlled from a maximum value in one polarity through zero to a maximum value in the opposite polarity, thus effecting a corresponding range of adjustment of the armature voltage and likewise an adjustment of speed of the first D. C. machine 25 from a maximum speed in one direction of rotation, through zero speed, to a maximum speed in the opposite direction.

Hence, by adjustment of the rheostat 30, the speed and direction of rotation of the induction frequency converter are controlled, thereby adjusting the frequency of the energy in the winding of the synchronous machine 3 relative to that of the bus 8, thereby causing a change in the speed of the motor generator set 1.

The effect of the speed change of the motor generator set 1 can be best explained by example. Assume that power is flowing from the 60 cycle bus 7 to the 25 cycle bus 8, whereby the 4-pole induction machine 2 operates as a motor, driving the 10-pole synchronous machine 3 as a generator at 300 R. P. M. and generating power at 25 cycles, while power at 50 cycles is converted to 25 cycles by the second M. G. set 4.

Now if the frequency on the bus 8 drops from 25 to 24 cycles, an adjustment of the rheostat 30, either by hand or automatically, causes the D. C. machine 25 to run at a speed whereby the frequency of the energy in the secondary leads 32 of the induction converter 20 is increased to substantially 30 cycles. If the induction converter 20 was designed with two poles, the speed necessary to generate the difference between 24 and 30 cycles is 360 R. P. M. With 30 cycle energy flowing in the winding of the synchronous machine 3, its speed is 360 R. P. M., at which speed the frequency of the energy flowing from the secondary winding of the induction machine 2 is 48 cycles. At 48 cycles, the synchronous motor 6 drives the generator 5 at 720 R. P. M. instead of 750 R. P. M., resulting in 24 cycles being generated in the synchronous generator 5 and delivered to the bus 8.

As power was assumed to be flowing toward the 25 cycle bus 8 from the synchronous machine 3, through the induction converter 20, the latter operates as a motor, 24/30 or 80% of the power flowing through the leads 21 to the bus and the remainder being generated by the D. C. machine 25 and applied as mechanical power to the shaft of the second M. G. set 4 by the D. C. machine 27.

At a given constant frequency, the direction and amount of power flow can also be controlled by the rheostat 30. By decreasing the field intensity of the D. C. machine 27, its counter E. M. F. is thereby decreased as its speed is practically constant. This decrease in counter-voltages causes an increase in current flow from the other D. C. machine 25 which is generating, thereby resulting in an increase in counter-torque of this machine 25. In order to balance this increased torque, the induction converter 20 draws more power from the synchronous generator 3, so that the flow of power from the 60 cycle bus 7 to the 25 cycle bus 8 is increased.

Conversely, by adjusting the rheostat in the opposite direction, the field intensity of the D. C. machine 27 increases, the counter-voltage of this machine increases, decreasing the flow of current from the other D. C. machine 25, causing a corresponding decrease in the power flow from the synchronous machine 3, and hence decreasing the total flow of power from the 60 cycle bus 7. If the rheostat adjustment be carried still farther, the voltage of the D. C. machine 27 controlled thereby, increases to the point where it exactly balances the voltage generated by the other D. C. machine 25, so that the latter machine exerts no torque. Likewise, the converter 20 adjusts its phase angle between rotor and stator windings so that it draws no power from the synchronous machine 3, which in turn causes the induction machine 2 to run idle, and no power is transmitted between systems.

A still further adjustment of the rheostat 30 causes the voltage of the D. C. machine 27 to rise above that of the other D. C. machine 25, resulting in a flow of power in the opposite direction, the converter 20, now being driven as a generator by the D. C. motor 25. The converter forces power from the 25 cycle bus 8 to the synchronous machine 3 which thereupon drives the induction machine 2 as a generator forcing power back to the 60 cycle bus. Power also flows from the 25 cycle bus through the M. G. set 4 to the secondary winding of the induction machine 2, in which machine it is converted into 60 cycle energy and transmitted to the busbars 7.

The flow of power between the D. C. machines 25, 27, is proportional to the relative deviations of the bus bar frequencies from the normal values. For example, if one frequency changes from 25 cycles to 24 cycles, the flow of power in the D. C. circuit is $1/25$ or 4% of the power flow between the two power systems. The capacity of each of the D. C. machines 25, 27 is therefore determined by the extent of frequency adjustment that is required. The speed range of the adjustable speed D. C. machine 25 is determined by the number of poles on the induction converter 20; the maximum speed in either direction of rotation is that required to effect the desired adjustment in speed of the synchronous machine 3.

The induction converter 20 must be designed to carry the power flowing to or from the synchronous machine 3, which, in the example given, is one-sixth of the total power transferred between systems. The mechanical power interchanged between the induction converter 20 and the D. C. machine 25, however, is determined by the extent of frequency adjustment, or 4% of the total power, in the example given.

The embodiment of Figure 2 is in general similar to that of Figure 1 with the principal exception that the synchronous machine 6 of the second motor generator set 4 in Figure 1 is replaced by a wound rotor type induction machine 35 in Figure 2. The primary winding of this machine 35 is connected to the bus bars 8 by leads 36 and a switch 37. The secondary winding is connected in series with the secondary winding of the other induction machine 2, by collector rings 38, brushes 39, leads 13, brushes 12, and collector rings 11. Hence, the two power systems can be said to be connected together through the two induction machines 2, 35 which are connected in series, each of which operates as an induction frequency converter, the power being converted in one of the machines to an intermediate predetermined frequency on the leads 13, and from that frequency it is converted to the frequency of the other system by means of the other induction machine. The speeds of the two induction machines are determined by the synchronous machines 3, 5 to which they are respectively coupled.

Assuming again by way of example that power is flowing from the 60 cycle bus 7 to the 25 cycle bus 8, a conversion from 60 cycles to 50 cycles can be effected if the induction machine 2 is designed with four poles and operated at 300 R. P. M. as in the foregoing example. This speed can be obtained by means of a 10-pole, 25 cycle synchronous machine 3 coupled to the induction machine 2 and connected electrically by means of leads 14, a switch 40 and a second switch 41 to the 25 cycle bus 8. An alternate arrangement may be obtained by designing the induction machine with two poles and operating it at 600 R. P. M. by connecting the 10-pole synchronous machine 3 to the 50 cycle leads 13 by a switch 42 instead of to the 25 cycle bus 8, thereby resulting in higher speed, lower torque machines in the first motor generator set 1. In this case, however, the second motor generator set would convert 100% of the power transferred between systems instead of $83\frac{1}{3}\%$ as in the other case.

The power is converted from 50 cycles to 25 cycles in the second induction machine 35, which is operated at one-half its synchronous speed. If it be a 4-pole machine by operating it at 750 R. P. M. half of the power input (neglecting losses) flows from its primary leads 36 at 25 cycles, the other half of the power being used to drive the 4-pole synchronous machine 5 as a generator, sending the generated 25 cycle power to the bus 8 through the leads 16 and switch 17. If both machines 5, 35 of the second motor generator set 4 are designed with 6 poles, the corresponding speed will then be 500 R. P. M.

As this embodiment provides no inherent means for voltage control between the two systems, there being a rigid tie through the two series connected induction machines 2, 35, some external means must be provided. For this purpose an adjustable ratio transformer 43 is indicated, connected in series with the 60 cycle leads 9 of the induction motor 2. This transformer is preferably of the well-known type provided with control means for changing its ratio of transformation while carrying full load. Power factor correction is obtained from the synchronous machines, as well as by adjusting the transformer ratio.

As explained in connection with Figure 1, in the case of a fixed frequency ratio converter, means are provided for angularly shifting the stator 18 of one of the synchronous machines 3 in its cradle 19 for controlling the amount and direction of power flow between the two power systems.

Means for adjusting the frequency ratio between the two systems of Figure 2 are shown similar to those in Figure 1. By opening the switch 40 and closing switch 22, the relatively small frequency converter 20 is inserted in series with the synchronous machine 3 as previously described. Speed and direction of rotation of the converter 20 are controlled by a D. C. machine 25 which is in turn controlled by a second D. C. machine 27 coupled to the second motor-generator set 4 or other suitable means, adjustments being effected by a rheostat 30 of the reversible type such as a potentiometer rheostat.

The advantage of the embodiment of Figure 2 over that of Figure 1 is that the synchronous machine 5 of the second motor generator set 4 is of smaller capacity, as part of the power input to this motor generator set is converted in the induction converter 35 directly, and therefore synchronous machine 5 is required to handle only the power interchanged between the two machines 5, 35 through their mechanical connection.

A problem presented by the converter of the present invention is the collecting of relatively large amounts of power continuously from collector rings. Although this has been successfully accomplished in practice, it is desirable to eliminate collector rings. Figure 3 shows a means for so doing. The machine 44 shown in Figure 3 may be substituted for any of the induction machines 2, 20, 35 in either embodiment provided the machine has at least 4 poles. The machine 44 comprises a shaft 45 and two rotor cores 46, 47 mounted on the shaft 45. A pair of stator cores 48, 49 cooperate respectively with the two rotor cores. The stator cores are mounted within a common frame 50.

Each of the stator cores has a conventional stator winding 51, 52 respectively, which are connected to respective leads 56, 57. Each of the rotor cores 46, 47 is wound with a respective rotor winding 53, 54. The two rotor windings are connected in series by leads 55 which are suitably secured to the rotor so that they can revolve with the shaft.

This machine 44 is, in effect, but two wound rotor machines coupled together with their rotor windings in series. The normal speed of such a combination is equal to the speed of a motor having a number of poles equal to the sum of the numbers of poles on the two machines. Hence, this machine 44 can be substituted for any of the wound rotor machines in this invention if the sum of the numbers of poles in the two sets of windings is equal to the number of poles which are required.

One of the stator windings 52 then becomes the primary winding, while the other stator winding 51 then becomes the secondary winding. For example, if the primary winding 52 be wound for 2 poles and the leads 57 connected to the 60 cycle bus 7, if the secondary winding 51 also be wound for 2 poles, and the shaft 45 be rotated at 300 R. P. M., then 5/6 of the input energy in the primary winding 52 will be delivered to the secondary leads 56 (neglecting losses) at a frequency of 50 cycles, the remaining one-sixth of the energy being transmitted mechanically through the shaft 45. The energy in the series connected rotor windings 53, 54 will be at 55 cycles.

Instead of the two sets of windings being designed for 2 poles and 2 poles respectively, they may be 2 poles and 4 poles to give equivalent 6 pole machine, or 4 poles and 4 poles to give an equivalent 8 pole wound rotor induction type machine.

I do not intend my invention to be limited to the details shown and described herein except as set forth in the following claims.

I claim:

1. Apparatus for transferring energy between two electrical power systems of different frequencies, said apparatus comprising in combination, a pair of alternating current machines connected electrically in series, conductors for connecting said series connected machines to one of said power systems, the frequency of alternation of the resultant voltage generated by said machines at said conductors being equal to the sum of the frequencies generated by the respective machines, and means for fixing the rotation of said machines at relatively different speeds, said means including a pair of synchronous type machines coupled to said alternating current machines, respectively, and connected electrically to the other of said power systems.

2. Apparatus for transferring energy between two electrical power systems of different frequencies, said apparatus comprising in combination, a pair of alternating current machines, means for combining the energy generated by said machines so that the resultant frequency of the combined energy is equal to the sum of the frequencies of the energy generated by the respective machines, means for connecting said machines to one of said power systems, and means for fixing the rotation of said machines at relatively different speeds, said means including a pair of synchronous type machines coupled to said machines, respectively, and connected electrically to the other of said power systems.

3. A frequency converter for interconnecting two electrical power systems of different frequencies, said converter comprising in combination, a wound rotor type induction machine having a primary winding connected to one of said systems and having a secondary winding, a second alternating current machine having a winding connected to said secondary winding, means for fixing the rotation of said machines at relatively different speeds, said means comprising a synchronous type machine coupled to each of said machines respectively, and means for connecting at least one of said synchronous machines to the other of said power systems.

4. A frequency converter for interconnecting two electrical power systems of different frequencies, said converter comprising in combination, a wound rotor type induction machine having a primary winding connected to one of said systems and having a secondary winding, a synchronous type machine having a winding connected in series with said secondary winding, means for fixing the rotation of said machines at relatively different speeds, said means comprising a synchronous type machine coupled to each of said machines respectively, and means for connecting at least one of said synchronous machines to the other of said systems.

5. A frequency converter for interconnecting two electrical power systems of different frequencies, said converter comprising in combination a pair of wound rotor type induction machines, each machine having a primary winding and a secondary winding, one of said primary windings being connected to each of said power systems respectively, said secondary windings being connected together in series, and means for fixing the rotation of said machines at relatively different speeds, said means comprising a synchronous type machine coupled to each of said induction machines respectively.

6. A frequency converter as claimed in claim 3, wherein said wound rotor type induction machine comprises two stator cores, two rotor cores co-operative respectively therewith, a primary winding on one of said stator cores, a secondary winding on the other of said stator cores, and a rotor winding on each of said rotor cores, said rotor windings being connected together in series.

7. A frequency converter as claimed in claim 4, wherein at least one of said wound rotor type induction machines comprises two stator cores, two rotor cores co-operative respectively therewith, a primary winding on one of said stator cores, a secondary winding on the other of said stator cores, and a rotor winding on each of said rotor cores, said rotor windings being connected together in series.

8. An adjustable ratio frequency converter for interconnecting two electrical power systems of different frequencies, said converter comprising in combination, a pair of alternating current machines connected electrically in series, conductors for connecting said series connected machines to one of said power systems, the frequency of alternation of the resultant voltage generated by said machines at said conductors being equal to the sum of the frequencies of the voltages generated by the respective machines, separate means coupled to each of said machines respectively for determining the speed thereof, at least one of said coupled means comprising an electrical machine connected to the other of said power systems, and means for adjusting the speed of one of said coupled means.

9. An adjustable ratio frequency converter for interconnecting two electrical power systems of different frequencies, said converter comprising two alternating current machines, means for combining the energy generated by said machines so that the resultant frequency of the combined energy is equal to the sum of the frequencies of the energy generated by the respective machines, means for connecting said machines to one of said power systems, a separate electrical machine coupled to each of said machines respectively for determining the speed thereof, one of said electrical machines being connected to the other of said power systems, and means for adjusting the speed of the other of said electrical machines.

10. An adjustable ratio frequency converter for interconnecting two electrical power systems of different frequencies, said converter comprising in combination, a wound rotor type induction machine having a primary winding connected to one of said power systems and a secondary winding, a second alternating current machine having a winding connected to said secondary winding, means comprising an electrical machine coupled to the shaft of each of said machines respectively, for determining the speed thereof, at least one of said electrical machines being connected to the other of said power systems, and means for adjusting the speed of one of said electrical machines.

11. An adjustable ratio frequency converter for interconnecting two electrical power systems of different frequencies, said converter comprising in combination, a wound rotor type induction machine having a primary winding connected to one of said systems and having a secondary winding, a synchronous type machine having a winding connected in series with said secondary winding, means for determining the speed of said machines, said means comprising a synchronous type machine coupled to the shaft of one of said machines and connected to the other of said power systems, and an electrical machine coupled to the other of said machines, and means for adjusting the speed of said electrical machine.

12. An adjustable ratio frequency converter for interconnecting two electrical power systems of different frequencies, said converter comprising in combination, a pair of wound rotor type induction machines, each machine having a primary winding and a secondary winding, one of said primary windings being connected to each of said power systems, respectively, said secondary windings being connected together in series, means coupled to each of said machines respectively for determining the speed thereof, and means for adjusting the speed of one of said coupled means independent of the other of said coupled means.

13. An adjustable ratio frequency converter for interconnecting two electrical power systems of different frequencies, said converter comprising in combination, a first motor generator set comprising a wound rotor type induction machine having a primary winding and a secondary winding, said primary winding being connected to one of said power systems, and a synchronous machine coupled to said induction machine, a second motor generator set comprising two synchronous type machines, one of said last named machines being electrically connected to said secondary winding and the other being connected to the other of said power systems, said synchronous machine of said first motor generator set being connected to one of said power systems in series with an induction frequency converter, a first direct current machine coupled to said induction frequency converter for controlling the speed thereof, and a second direct current machine for controlling the speed of said first direct current machine, said second direct current machine having suitable driving means coupled thereto.

14. An adjustable ratio frequency converter for interconnecting two electrical power systems of different frequencies, said converter comprising in combination, a pair of motor generator sets, each set comprising a wound rotor type induction machine having a primary winding and a secondary winding, and a synchronous machine coupled to said induction machine, one of said primary windings being connected to each of said power systems respectively, said secondary windings being connected together in series, the synchronous machine of one of said sets being connected to one of said power systems and the synchronous machine of the other of said sets being connected in parallel with said secondary windings, an induction frequency converter connected in series with the last named synchronous machine, a first direct current machine coupled to said induction frequency converter for controlling the speed thereof, and a second direct current machine for controling the speed of said first direct current machine, said second direct current machine having suitable driving means coupled thereto.

15. An adjustable ratio frequency converter for interconnecting two electrical systems of different frequencies, said converter comprising in combination, a pair of alternating current machines connected electrically in series, conductors for connecting said series connected machines to one of said systems, the frequency of alternation of the resultant voltage generated by said machines at said conductors being equal to the sum of the frequencies generated by the respective machines, a synchronous type machine coupled to the shaft of each of said machines respectively, for determining the speed thereof, one of said synchronous type machines being electrically connected to the other of said systems, and means for adjusting the frequency of the electrical energy in the other synchronous type machine.

16. An adjustable ratio frequency converter for interconnecting two power systems of different frequencies, said converter comprising in combination, a wound rotor type induction machine having a primary winding connected to one of said power systems and a secondary winding, a second alternating current machine having a winding connected to said secondary winding, a synchronous type machine coupled to each of said machines respectively, for determining the speed thereof, one of said synchronous type machines being connected to the other of said power systems, and means for adjusting the frequency of the electrical energy in the other of said synchronous type machines.

17. An adjustable ratio frequency converter for interconnecting two electrical power systems of different frequencies, said converter comprising in combination, a wound rotor type induction machine having a primary winding connected to one of said systems and having a secondary winding, a synchronous type machine having a winding connected in series with said secondary winding, a synchronous type machine coupled to each of said machines respectively for determining the speeds thereof, an induction type frequency converter one of the last-mentioned synchronous type machines being connected to the other of said power systems, the other of said synchronous type machines being connected to the last-mentioned power system through said induction type frequency converter, and means for adjusting the speed of said induction frequency converter.

18. An adjustable ratio frequency converter for interconnecting two electrical power systems of different frequencies, said converter comprising in combination, a pair of wound rotor type induction machines, each machine having a primary winding and a secondary winding, one of said primary windings being connected to each of said power systems respectively, said secondary windings being connected together in series, a synchronous type machine coupled to each of said machines respectively for determining the speed thereof, one of said synchronous machines being connected to one of said power systems, and frequency converter means for adjusting the frequency of the electrical energy in the other of said synchronous machines.

ALLEN M. ROSSMAN.